United States Patent

Kato et al.

[11] Patent Number: 5,632,472
[45] Date of Patent: May 27, 1997

[54] FLUID-FILLED ELASTIC MOUNT INCLUDING RESONANCE MEMBER DISPOSED IN FLUID CHAMBER AND HAVING FLUID PASSAGES BETWEEN SPACED-APART INNER AND OUTER PORTIONS

[75] Inventors: Rentaro Kato; Takashi Yoshida, both of Kasugai, Japan

[73] Assignee: Tokai Rubber Industries, Ltd., Japan

[21] Appl. No.: 589,103

[22] Filed: Jan. 23, 1996

[30] Foreign Application Priority Data

Feb. 6, 1995 [JP] Japan .................................. 7-017794

[51] Int. Cl.$^6$ ........................... F16M 5/00; B60K 5/12
[52] U.S. Cl. ........................... 267/140.13; 248/562
[58] Field of Search ..................... 267/140.11, 140.13, 267/140.4, 141.3, 141.4, 141.5, 219; 248/562; 180/300, 312

[56] References Cited

U.S. PATENT DOCUMENTS

| | | | |
|---|---|---|---|
| 4,660,812 | 4/1987 | Dan et al. | 267/140.13 |
| 4,742,999 | 5/1988 | Flower | 267/140.13 |
| 4,762,309 | 8/1988 | Hutchins | 248/562 |
| 4,826,126 | 5/1989 | Katayama et al. | 248/562 |
| 4,872,652 | 10/1989 | Rohner et al. | 267/140.14 |
| 4,886,252 | 12/1989 | Haussermann | 267/140.13 |
| 4,997,168 | 3/1991 | Kato | 248/562 |
| 5,180,148 | 1/1993 | Muramatsu | 248/562 |

FOREIGN PATENT DOCUMENTS

| | | |
|---|---|---|
| 3239787 | 9/1983 | Germany . |
| 60-104824 | 6/1985 | Japan . |
| 2-31933 | 2/1990 | Japan . |

Primary Examiner—Robert J. Oberleitner
Assistant Examiner—Chris Schwartz
Attorney, Agent, or Firm—Parkhurst, Wendel & Burr, L.L.P.

[57] ABSTRACT

Fluid-filled elastic mount wherein first and second mounting members are connected by an elastic body which partially defines a fluid space in which a resonance member is disposed while being supported by the first mounting member such that an outer annular portion of the resonance member cooperates with the inner surface of the fluid space to define an annular fluid passage and such that the annular portion is abuttable on a stop portion provided on the second mounting member, the resonance member including an inner portion fixed to the first mounting member, and an intermediate portion connecting the inner and annular portions such that the inner and outer portions are spaced apart from each other in a load-receiving direction, the intermediate portion having fluid passages having a total fluid communication area not smaller than three quarters of the surface area of the intermediate portion, which surface area is not smaller than a half of the surface area of the resonance member.

15 Claims, 6 Drawing Sheets

FLUID-FILLED ELASTIC MOUNT INCLUDING RESONANCE MEMBER DISPOSED IN FLUID CHAMBER AND HAVING FLUID PASSAGES BETWEEN SPACED-APART INNER AND OUTER PORTIONS

BACKGROUND OF THE INVENTION

1. Field of the Invention

The present invention relates in general to a fluid-filled elastic mount adapted to provide a vibration damping effect on the basis of flows of a fluid, and more particularly to such a fluid-filled elastic mount wherein a resonance member which is oscillated upon application of a vibrational load to the mount partially defines a restricted fluid passage.

2. Discussion of the Related Art

There is known an elastic mount such as an engine mount for a motor vehicle, which is interposed between two members of a vibration system such that those two members are flexibly connected to each other, or such that one of the two members is supported by the other member in a vibration damping or isolating manner. One example of such an elastic mount is a fluid-filled elastic mount wherein a first and a second mounting member which are attached to the respective two members of the vibration system are spaced apart from each other and elastically connected by an elastic body, which partially define a fluid chamber filled with a non-compressible fluid, so that a vibrational load applied to the elastic mount is damped on the basis of flows or resonance of the non-compressible fluid. One type of such a fluid-filled elastic mount is disclosed in JP-U-2-31933, wherein a hat-shaped resonance member supported by the first mounting member is disposed in the fluid chamber partially defined by the elastic body, such that the fluid chamber is substantially divided by the resonance member into two sections on the opposite sides of the resonance member as viewed in a direction (hereinafter referred to as "load-receiving direction") in which the vibrational load is primarily applied, and such that the periphery of the resonance member cooperates with the corresponding portion of the inner surface of the fluid chamber to define an annular restricted fluid passage which permits restricted flows of the fluid between the two sections of the fluid chamber. The restricted fluid passage partially defined by the hat-shaped resonance member can be adapted to have a comparatively large area for fluid communication, and is effective to damp the vibrations whose frequencies are medium or relatively high. The resonance member may be positioned so that its peripheral portion is opposed to and abuttable on a stop portion provided on the second mounting member, for limiting the amount of relative displacement of the first and second mounting members in the load-receiving direction.

In the fluid-filled elastic mount constructed as described above, the frequencies of the vibrations that can be damped on the basis of resonance of the fluid flowing through the annular restricted fluid passage can be adjusted by tuning the area of the annular restricted fluid passage. To this end, the size of the resonance member is suitably determined so as to establish the desired width of the annulus of the restricted fluid passage, that is, the distance between the maximum or largest outside diameter of the resonance member and the inner surface of the fluid chamber, depending upon the desired damping characteristics to be exhibited by the elastic mount. Where the fluid-filled elastic mount is used as a motor vehicle engine mount, the annular restricted fluid passage may be tuned to effectively damp high-frequency vibrations such as a gear noise, and a booming noise generated during running of the vehicle at a relatively high speed. In this case, the restricted fluid passage should have a relatively large area or width, and the resonance member should have an accordingly small size (accordingly small maximum outside diameter).

However, a decrease in the size of the hat-shaped resonance member results in a decrease in the area of contact of the resonance member with the stop portion indicated above. Hence, it has been difficult to enable the elastic mount to exhibit the desired damping characteristics with respect to the high-frequency vibrations, while assuring an excellent function of limiting the relative displacement of the first and second mounting members by the abutting contact of the resonance member with the stop portion.

JP-A-60-104824 discloses a fluid-filled elastic mount wherein a disk-like resonance member attached to the first mounting member and partially defining an annular restricted passage has through-holes formed through its thickness, so that the through-holes act as secondary fluid passage and cooperate with the annular fluid passage to provide restricted fluid passage means having a relatively large total area for fluid communication. The publication identified above also discloses a disk-like resonance member having radial slots in place of the through-hole. However, the fluid-filled elastic mount wherein the resonance member has such through-holes or radial slots is still unsatisfactory in the fluid communication area of the restricted fluid passage means. In other words, the disk-like resonance member formed with through-holes or radial slots having a sufficiently large total fluid communication area inevitably suffers from a considerable amount of reduction in its strength and a high possibility of deformation thereof upon abutting contact with the stop portion, leading to a failure of the resonance member to function as stop means in cooperation with the stop portion.

SUMMARY OF THE INVENTION

It is therefore an object of the present invention to provide an improved fluid-filled elastic mount wherein the resonance member provides a restricted fluid passage with a sufficiently large fluid communication area and at the same time has a sufficient strength, so that the elastic mount is capable of exhibiting a high damping effect with respect to high-frequency vibrations while effectively functioning as part of a stop mechanism for limiting relative displacement of the first and second mounting members.

The above object may be achieved according to the principle of the present invention, which provides a fluid-filled elastic mount including (a) a first and a second mounting member which are spaced apart from each other in a load-receiving direction in which a vibrational load is primarily applied to the fluid-filled elastic mount, (b) an elastic body which elastically connects the first and second mounting members and which partially defines a fluid-tight space filled with a non-compressible fluid, (c) a resonance member which is supported by the first mounting member and which has an outer portion cooperating with an inner surface of the fluid-tight space to define an annular restricted fluid passage, the resonance member substantially dividing the fluid-tight space into two sections which are arranged in the load-receiving direction and which communicate with each other through the annular restricted fluid passage, and (d) a stop portion provided on the second mounting member such that the outer portion of the resonance member is abuttable on the stop portion to limit an mount of relative displacement of the first and second mounting members in the load-receiving direction, wherein the resonance member comprises an inner portion fixed to the first mounting member, an annular portion as the outer portion abuttable on the stop portion, and an intermediate portion interposed between the inner and annular portions. The intermediate portion includes a plurality of connectors connecting the inner and outer portions such that the inner and outer portions are spaced apart from each other in the load-receiving direction. The intermediate portion has a surface area not smaller than a half of an entire surface area of the resonance member, and has a plurality of windows which are separated from each other by the connectors and which function as fluid passages in addition to the annular restricted fluid passage. The fluid passages which correspond to the windows have a total area of fluid communication therethrough, which total area is not smaller than three quarters of the surface area of the intermediate portion.

In the fluid-filled elastic mount of the present invention constructed as described above, the inner portion and the outer annular portion of the resonance member are spaced apart from each other in the load-receiving direction and are connected by the connectors of the intermediate portion, and the intermediate portion has the windows serving as fluid passages in addition to the annular restricted fluid passage which is partially defined by the outer annular portion. The intermediate portion of the resonance member may be a tapered portion extending radially outwardly from the inner portion toward the outer annular portion, or a cylindrical portion having the same diameter as the inner portion. Alternatively, the intermediate portion may be a combination of a tapered section extending radially outwardly from the inner portion toward the outer annular portion, and a cylindrical section which is contiguous with the tapered section and which has the same diameter as the annular portion.

Since the windows are formed through the intermediate portion between the inner and outer portions of the resonance member, these windows may be easily formed to have a larger total area of opening than those formed through a generally flat disk-like resonance member, even where the resonance member of the present elastic mount and the disk-like resonance member have the same surface area as viewed in a plane perpendicular to the load-receiving direction.

According to the present invention, therefore, the total area of fluid communication through the fluid passages provided by the windows can be made sufficiently large, without increasing the external dimension of the resonance member. In the present fluid-filled elastic mount, the intermediate portion is formed to have a surface area not smaller than one half of the entire surface area of the resonance member, and the windows are formed to have a total area of opening which is not smaller than three quarters of the surface area of the intermediate portion. Accordingly, the total area of fluid communication through the fluid passages provided by the windows can be made large enough to effectively damp high-frequency vibrations.

Further, the outer annular portion of the resonance member is adapted to abut on the stop portion over its entire annular area, the annular portion has higher degrees of mechanical strength and resistance to an input load, than a resonance member whose outer peripheral portion has radial slits. Accordingly, the present elastic mount has higher capability of maintaining its nominal attitude upon application of a large vibrational load.

According to one preferred form of the present invention, the connectors of the intermediate portion of the resonance member are equally spaced from each other in a circumferential direction of the annular portion, so that the windows are equally spaced from each other in the circumferential direction. According to this arrangement, the resonance member has uniform mechanical strength over the entire area, while permitting the windows and fluid passages to have a sufficiently large total area of opening or fluid communication.

According to another preferred form of the invention, the annular restricted passage and the fluid passages corresponding to the windows have a ratio $A2/A1$ selected within a range of 1–3, where $A1$ represents an area of fluid flow through the annular restricted fluid passage, and $A2$ represents the total area of fluid communication through the fluid passages corresponding to the windows. This arrangement is effective to not only permit the resonance member to have a sufficient mechanical strength, but also permit the resonance member to have a sufficiently large total area of fluid communication through the annular restricted fluid passage partially defined by the outer annular portion and through the fluid passages provided by the windows formed through the intermediate portion.

According to a further preferred form of this invention, the annular portion of the resonance member and the stop portion provided on the second mounting member constitute a first stop mechanism for limiting the amount of relative displacement of the first and second mounting members away from each other in the load-receiving direction, and the fluid-filled elastic mount further comprises another stop portion fixed to the second mounting member such that the above-indicated another stop portion is abuttable on the inner portion of the resonance member, so that the inner portion and the another stop portion constitute a second stop mechanism for limiting the amount of relative displacement of the first and second mounting members toward each other in the load-receiving direction. According to this arrangement, the first and second stop mechanisms are effective to prevent excessive rebounding and bounding relative displacements of the first and second mounting members. These stop mechanisms are partly constituted by the outer and inner portions of the resonance member within the fluid-tight space, these stop mechanisms can be made relatively simple and compact in construction.

BRIEF DESCRIPTION OF THE DRAWINGS

The above and optional objects, features, advantages and technical or industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
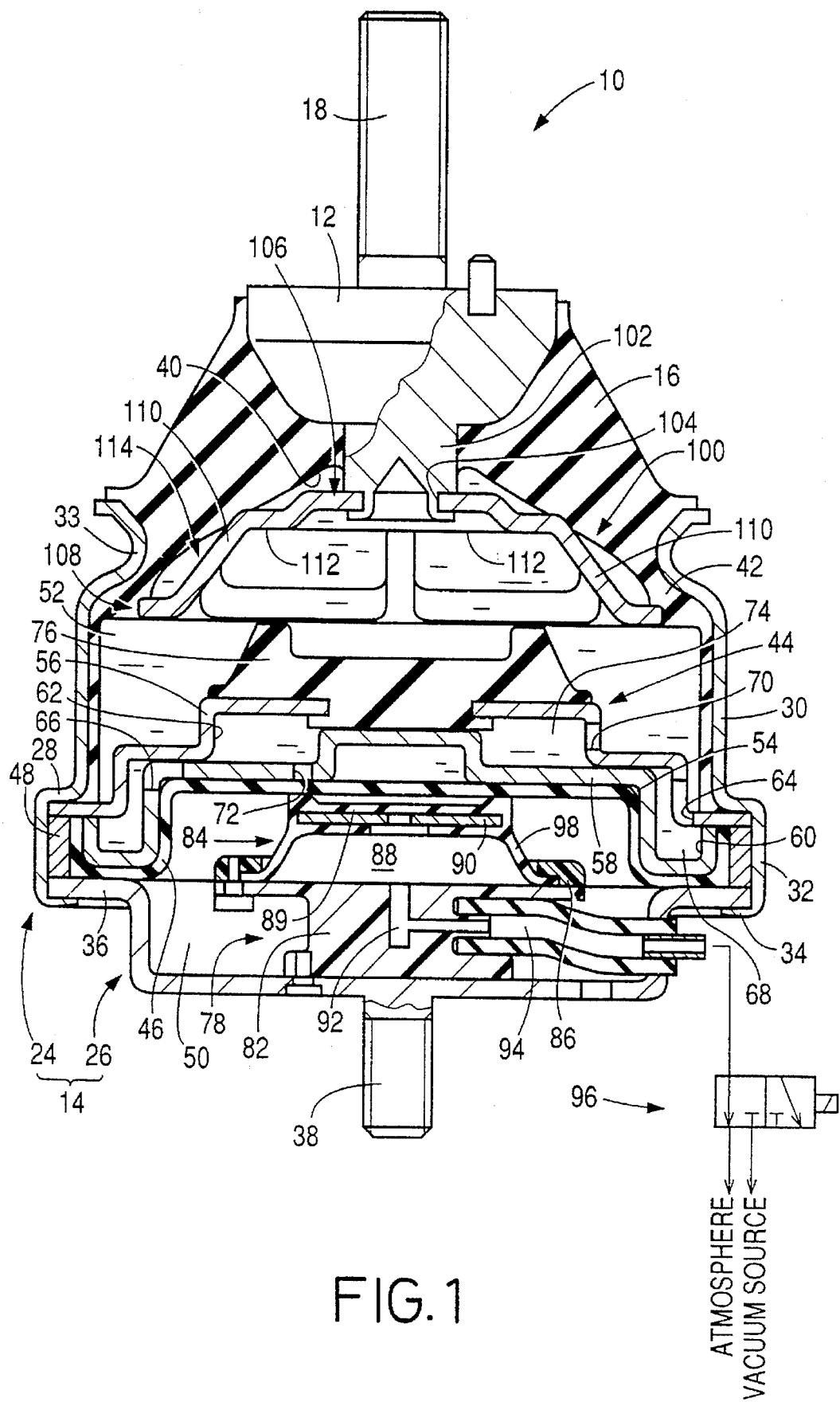
FIG. 1 is an elevational view in longitudinal or axial cross section of an engine mount constructed according to one embodiment of this invention.

Referring first to FIG. 1, there is shown one embodiment of a fluid-filled elastic mount of the present invention in the form of an engine mount 10 for use on an automotive vehicle. The engine mount 10 has a first mounting member 12 to be attached to one of a power unit and a body of the vehicle, and a second mounting member 14 to be attached to the other of the vehicle power unit and body. For instance, the first mounting member 12 is attached to the power unit while the second mounting member 14 is attached to the vehicle body. The first and second mounting members 12, 14 are elastically connected to each other by an elastic body 16 interposed therebetween. With the present engine mount 10 installed on the vehicle, the power unit is mounted on the vehicle body in a vibration damping fashion.

Figure 2:
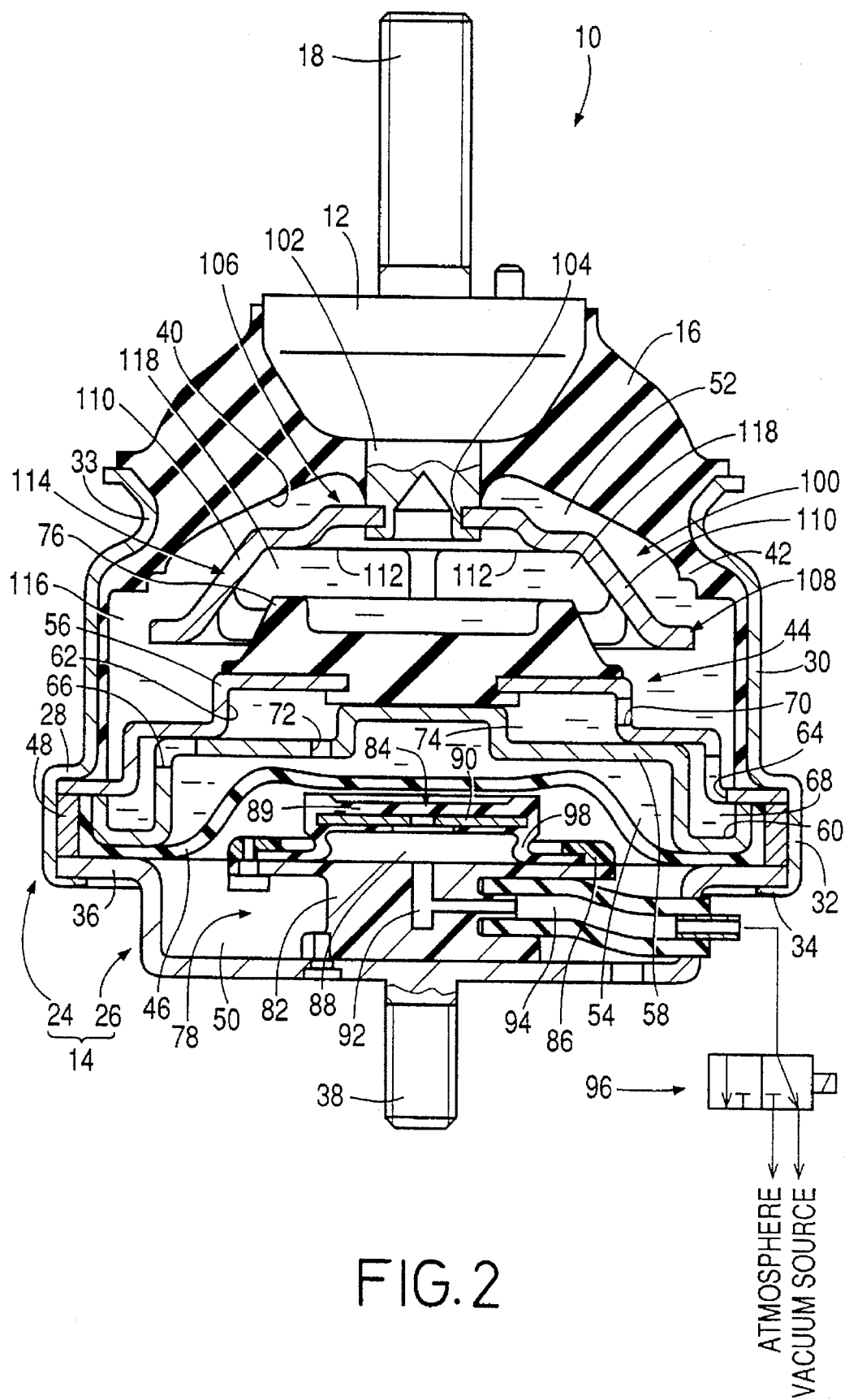
FIG. 2 is an elevational view in longitudinal cross section of the engine mount of FIG. 1 in an operating state different from that of FIG. 1.

When the present engine mount 10 is installed on the vehicle as indicated above, the weight of the power unit acts on one of the first or second mounting members 12, 14 in the vertical direction, and the two mounting members 12, 14 are displaced toward each other in the vertical direction by a certain distance, from the position of FIG. 1 to the position of FIG. 2. The engine mount 10 receives a vibrational load primarily in the vertical direction (as seen in FIGS. 1 and 2) or a direction substantially parallel to the vertical direction. This direction will be referred to as "load-receiving direction" where appropriate.

The first mounting member 12 has a generally inverted frustoconical shape having a large-diameter end portion and a small-diameter end portion. A first mounting bolt 18 is secured at one end thereof to the large-diameter end of the first mounting member 12, so that the first mounting member 12 is attached to the vehicle body or power unit through the first mounting bolt 18.

The second mounting member 14 consists of a cylindrical member 24 having a relatively large diameter, and a cup-shaped bottom member 26 which is fixed by calking to the lower axial open end of the cylindrical member 24. The cup-shaped bottom member 26 has a relatively small depth or axial length. Thus, the second mounting member 14 is a generally cylindrical member which has a relatively large diameter and which is open at its upper axial end and closed at its lower axial end. The cylindrical member 24 has a shoulder 28 at an axially intermediate portion thereof, and includes a small-diameter portion 30 on the upper side of the shoulder 28, and a large-diameter portion 32 on the lower side of the shoulder 28. The small-diameter portion 30 has a constricted part 33 near the upper open end, which part 33 consists of a curved projection which protrudes radially inwardly of the small-diameter portion 30. The large-diameter portion 32 is provided with a calking part 34 at its lower open end, while the cup-shaped bottom member 26 includes a flange portion 36 radially outwardly extending from its open end. The bottom member 26 is secured to the cylindrical member 24, with the flange portion 36 of the bottom member 26 being calked to the large-diameter portion 32 of the cylindrical member 24 by means of the calking part 34. The cup-shaped bottom member 26 is provided with a second mounting bolt 3B extending downwardly from a central part of its bottom wall, so that the second mounting member 14 is attached to the vehicle body or power unit through the second mounting bolt 38.

The first mounting member 12 is spaced apart from the second mounting member 14 in the axial direction, by a suitable distance from the upper open end of the second mounting member 14, which distance is determined by the axial dimension of the elastic body 16 interposed between the first and second mounting members 12, 14. The elastic body 16 has a generally frustoconical shape, and is bonded at its small-diameter end to the first mounting member 12 and at its large-diameter end to the inner circumferential surface of the constricted part 33 of the second mounting member, in a vulcanization process wherein a rubber material of the elastic body 16 is vulcanized in a mold in which the first and second mounting members 12, 14 are suitably positioned relative to each other before injection of the rubber material. With this vulcanization process, there is obtained an intermediate product consisting of the first and second mounting members 12, 14 and the elastic body 16 bonded to the members 12, 14 such that the upper open end of the cylindrical member 24 is fluid-tightly closed by the elastic body 16. The elastic body 16 has a recess 40 formed in its large-diameter end face. This recess 40, which has a generally conical shape, cooperates with the second mounting member 14 to define an interior space of the engine mount 10. The recess 40 is partially defined by an annular first rubber buffer 42, which is formed integrally with the elastic body 16, on the inner circumferential surface of the constricted part 33.

In a relatively lower portion of the interior space indicated above, there are fixedly disposed an assembly of a partition member 44 and a flexible diaphragm 46 such that the outer peripheral portions of these partition member 44 and diaphragm 46 are superposed on each other and accommodated in the large-diameter portion 32 of the cylindrical member 24, together with the flange portion 36 of the cup-shaped bottom member 26. The peripheral portions of the partition member 44 and diaphragm 46, flange portion 36 and a metal ring 48 are gripped by and between the shoulder 28 and the calking part 34, whereby the partition member 44 and diaphragm 46 are fixed to the second mounting member 14.

The diaphragm 46 is a thin rubber layer having a circular shape and bonded to the metal ring 48, which is forced by the calking part 34 onto the shoulder 28 via the flange portion 36 and the outer peripheral portion of the partition member 44. Thus, the lower open end of the cylindrical member 24 is fluid-tightly closed by the diaphragm 46. The elastic body 16 and the diaphragm 46 fluid-tightly closing the upper and lower open ends of the cylindrical member 24 cooperate with the cylindrical member 24 to define a fluid-tight space filled with a suitable non-compressible fluid. The above-indicated interior space of the engine mount 10 is thus divided by the diaphragm 46 into the fluid-tight space on the side of the elastic body 16, and an air chamber 50 on the side of the cup-shaped member 26. The air chamber 50 permits displacement or deformation of the diaphragm 46 upon application of a vibrational load to the engine mount 10. The non-compressible fluid filling the fluid-tight space preferably has a viscosity of not higher than 0.1 Pa.s, and may be preferably selected from among water, alkylene glycol, polyalkylene glycol and silicone oil, for enabling the engine mount 10 to exhibit an excellent vibration damping effect on the basis of resonance of the fluid, as described below in detail.

The partition member 44 is a generally disk-like member consisting of two circular stepped metal plates 56, 58 which are superposed on each other and have radially inner stepped portions. The partition member 44 is located within the fluid-tight space, adjacent to the diaphragm 46, and is fixed at its peripheral portion to the second mounting member 14 by the calking part 34. The partition member 44 divides the fluid-tight space into two sections on the opposite sides thereof, namely, a pressure-receiving chamber 52 partially defined by the elastic body 16, and an equilibrium chamber 54 partially defined by the diaphragm 46. Upon application of the vibrational load between the first and second mounting members 12, 14, the pressure of the fluid in the pressure-receiving chamber 52 varies due to elastic deformation of the elastic body 16, while the volume of the equilibrium chamber 54 is permitted to vary by displacement of the diaphragm 46 in the presence of the air chamber 50.

To a central portion of the upper metal plate 56 of the partition member 44, there is bonded a second rubber buffer 76 having a generally frustoconical shape. This rubber buffer 76 extends in the pressure-receiving chamber 52 toward the elastic body 16.

The upper and lower metal plates 56, 58 define therebetween a first annular passage 60 and a second annular passage 62 which are concentric with each other. The first annular passage 60 has a larger diameter than the second annular passage 62, and is located radially outwardly of the second annular passage 62. The radially outer first annular passage 60 communicates with the pressure-receiving and equilibrium chambers 52, 54 through respective communication holes 64, 66, while the radially inner second annular passage 62 communicates with the chambers 52, 54 through respective communication holes 70, 72. The first annular passage 60 and the communication holes 64, 66 cooperate to define a first orifice 68, while the second annular passage 62 and the communication holes 70, 72 cooperate to define a second orifice 74. The second orifice 74 has a higher ratio A/L than the first orifice 68, where "A" and "L" represent a a cross sectional area and a length of each orifice 68, 74, respectively. That is, the second orifice 74 is tuned to effectively damp vibrations having relatively high frequencies while the first orifice 68 is tuned to effectively damp vibrations having relatively low frequencies. For instance, the first orifice 68 is tuned to exhibit a high damping effect with respect to low-frequency vibrations such as engine shakes, while the second orifice 74 is tuned to exhibit a high isolating effect with respect to medium-frequency vibrations such as engine idling vibrations. These vibration damping and isolating effects are based on resonance of the fluid flowing through the first and second orifices 68, 74.

The communication hole 72 for fluid communication of the second orifice 74 with the equilibrium chamber 54 is formed through an almost central portion of the lower metal plate 58, so that the communication hole 72 is opposed to the diaphragm 46. In the air chamber 50 defined by and between the diaphragm 46 and the cup-shaped bottom member 26, there is disposed a pushing mechanism 78 for pushing a central portion of the diaphragm 46 onto the lower surface of the lower metal plate 58, to thereby close the communication hole 72 for cutting the fluid communication between the pressure-receiving and equilibrium chambers 52, 54 through the second orifice 74.

The pushing mechanism 78 includes a base member 82 fixed to a central part of the bottom member 26, and an inverted-cup-shaped elastic pusher member 84 which is air-tightly secured at its open end to the upper surface of the base member 26 by a retainer ring 86. The elastic pusher member 84 cooperates with the upper surface of the base member 26 to define an air-tight operating chamber 88. The elastic pusher member 84 has a top wall 89 in which is embedded a hard pusher plate 90. The top wall 89 is aligned with the central part of the lower metal plate 58 in which the communication hole 72 is formed. The base 82 has an air passage 92 formed therethrough, which communicates at one end thereof with the operating chamber 88. The other end of the air passage 92 is connected to an air conduit 94, which in turn is connected to a switch valve 96. With this switch valve 96 selectively operated between two positions, the operating chamber 88 is selectively connected to the atmosphere or a vacuum source.

With the operating chamber 88 connected to the atmosphere through the switch valve 96, the top wall 89 of the elastic pusher member 84 is upwardly biased by an elastic force of a tapered portion 98 of the elastic pusher member 84, so that the top wall 89 forces the diaphragm 46 onto the lower surface of the lower metal plate 58, whereby the communication hole 72 is closed to cut the fluid communication between the pressure-receiving and equilibrium chambers 52, 54 through the second orifice 74, namely, to disable the second orifice 74. In this condition in which the communication hole 72 is closed by the diaphragm 46, some elastic force of the tapered portion 98 of the elastic pusher member 84 acts on the diaphragm 46 to effectively bias the diaphragm 46 onto the lower metal plate 58.

When the operating chamber 88 is connected through the switch valve 96 to the vacuum source and the pressure in the space 88 is reduced below the atmospheric pressure, the top wall 89 of the elastic pusher member 84 is retracted downward against the elastic biasing force of the tapered portion 98, so as to release the diaphragm 46 away from the lower metal plate 58, as shown in FIG. 2, whereby the communication hole 72 is open to the equilibrium chamber 54, to enable the second orifice 74 to be operative.

Thus, by controlling the switch valve 96 to connect the operating chamber 88 selectively to the atmosphere and vacuum source, the second orifice 74 is disabled or enabled to effect the intended vibration isolating operation. Described more specifically, the low-frequency vibrations such as the engine shake can be effectively damped by resonance of the fluid flowing through the first orifice 68 when the operating chamber 88 is connected to the atmosphere to disable the second orifice 74 to cut the fluid communication therethrough. That is, the amount of the fluid flow through the first orifice 6S is increased when the second orifice 74 is disabled by closing the communication hole 72 with the operating chamber 88 held at the atmospheric pressure. On the other hand, the medium-frequency vibrations such as the engine idling vibration can be effectively isolated by resonance of the fluid flowing through the second orifice 74 when the second orifice 74 is enabled to operate to effect the fluid communication therethrough with the operating chamber 88 held at the reduced pressure in communication with the vacuum source. That is, the second orifice 74 provides a relatively low dynamic spring constant based on the flows of the fluid therethrough. It is noted that the first orifice 68 is always held in communication with the pressure-receiving and equilibrium chambers 52, 54, irrespective of the selected position of the switch valve 96, namely, also when the second orifice 74 is operative. Since the ratio A/L of the first orifice 68 is lower than that of the second orifice 74, the first orifice 68 has a higher resistance to the fluid flows. Therefore, even when the first orifice 68 is open, the amount of flow of the fluid through the second orifice 74 is large enough to assure the intended effect of isolating the medium-frequency vibrations.

In the present embodiment, the pushing mechanism 78 is disposed within the air chamber 50, for influencing the diaphragm 46 to selectively open and close the communication hole 72 for thereby selectively enabling and disabling the second orifice 74. Thus, the present engine mount 10 does not require any valve means or other switching means disposed within the fluid-tight space (chambers 52, 54 isolated from the air chamber 50) and is accordingly simple in construction and relatively easy to manufacture. It will be understood that the pushing mechanism 78, air conduit 94 and switch valve 96 constitute an actuator device for enabling and disabling the second orifice 74.

Figure 3:
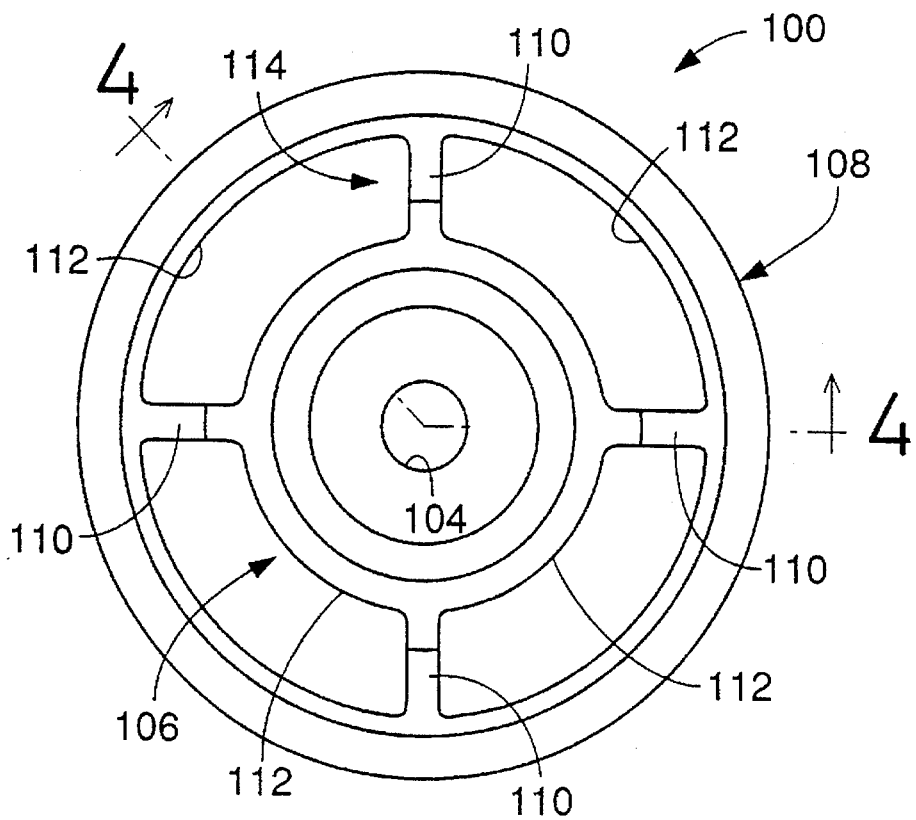
FIG. 3 is a plan view of a hat-shaped resonance member provided in the engine mount of FIG. 1.
Figure 4:
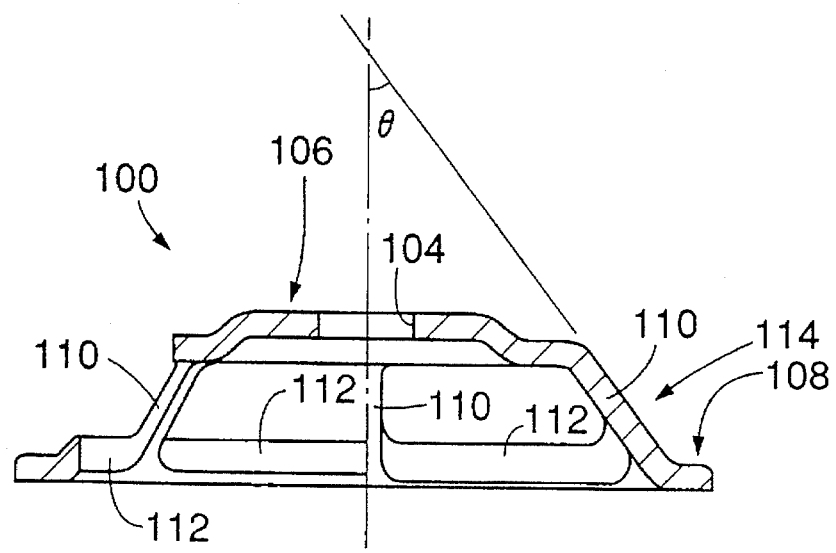
FIG. 4 is a cross sectional view taken along line 4—4 of FIG. 3.

In the pressure-receiving chamber 52 between the elastic body 16 and the partition member 44, there is disposed a hat-shaped resonance member 100 which is secured by calking to one end of a support rod 102, which in turn is secured at the other end to the first mounting member 12 such that the support rod 102 projects into the pressure-receiving chamber 52. The hat-shaped resonance member 100 generally extends from the support rod 102 radially outwardly in a direction substantially perpendicular to the load-receiving direction. As also shown in FIGS. 3 and 4, the resonance member 100 includes an inner portion in the form of a generally disk-shaped central disk portion 106 having a relatively small diameter and a central fixing hole 104. The resonance member 100 is secured to the support rod 102 such that the lower end portion of the support rod 102 is inserted through the central hole 104 and is then calked onto a central inner surface portion of the central disk portion 106 of the resonance member 100. The resonance member 100 further includes an outer portion in the form of an annular portion 108 disposed radially outwardly of the central disk portion 106, and connectors in the form of four radial connecting spokes 110 which extend between the outer circumference of the disk portion 106 and the inner circumference of the annular portion 108, so that the disk and annular portions 106, 108 are integrally connected to each other by the radial connecting spokes 110 in concentric or coaxial relation with each other such that the disk and annular portions 106, 108 are spaced from each other in the axial direction. The annular portion 108 has an inside diameter which is smaller by a predetermined value than an outside diameter of the disk portion 106, and an outside diameter which is larger by a predetermined value than an inside diameter of the pressure-receiving chamber 52. As indicated in FIG. 4, the radial connecting spokes 110 are inclined by an angle 8 with respect to the axis of the resonance member 100.

The hat-shaped resonance member 100 has four arcuate windows 112 which are separated from each other by the radial connecting spokes 110 and are arranged in the circumferential direction. In the present embodiment, the four radial connecting spokes 110 are substantially equally spaced from each other in the circumferential direction of the resonance member 100, so that each arcuate window has a length which is slightly smaller than a quarter of the circumference of the resonance member 100, as measured in the circumferential direction of the resonance member 100. In other words, the resonance member 100 has an intermediate tapered or conical portion 114 having the four arcuate windows 112 between the central disk portion 106 and the outer annular portion 108.

The intermediate tapered portion 114 of the resonance member 100 is preferably formed so as to have an area which is not smaller than a half of the entire surface area of the resonance member 100. In the present embodiment, the surface area of the intermediate tapered portion 114 is about 58% of the entire surface area of the resonance member 100. The word "area" is not an area as viewed in the plan view of FIG. 3, but is an area measured along the profile of the resonance member 100 as shown in FIG. 4. The four arcuate windows 114 are preferably formed so as to have a total area of opening for fluid communication, which total area is not smaller than three quarters of the entire surface area of the intermediate tapered portion 114. In the present embodiment, the total area of opening of the four windows 114 is about 85% of the surface area of the intermediate tapered portion 114. The "area" of the windows 114 should be interpreted in the same manner as described above.

Thus, the resonance member 100 constructed as described above is fixed to the support rod 102 secured to the first mounting member 12, such that the resonance member 100 is disposed in the pressure-receiving chamber 52, extending radially outwardly of the support rod 102 in the direction substantially perpendicular to the load-receiving direction. With the engine mount 10 installed on the vehicle body, the first and second mounting members 12, 14 are displaced toward each other in the axial direction by the weight of the power unit of the vehicle, whereby the resonance member 100 is positioned in an almost central portion of the pressure-receiving chamber 52, as shown in FIG. 2. As a result, the pressure-receiving chamber 52 is substantially divided by the resonance member 100 into two sections (upper and lower sections as seen in FIG. 2) which communicate with each other through an annular restricted fluid passage 116 and four arcuate fluid passages 118. The annular restricted fluid passage 116 is an annular gap formed between the outer periphery of the annular portion 108 of the resonance member 100 and the corresponding portion of the inner circumferential surface of the pressure-receiving chamber 52. The four arcuate fluid passages 118 are provided by the respective four arcuate windows 112 formed through the intermediate tapered portion 114 of the resonance member 100. The engine mount 10 is designed so that a ratio A2/A1 is selected within a range of 1–3, where "A1" represents an area of fluid communication through the annular restricted fluid passage 116 as measured in a plane perpendicular to the axis of the engine mount 10, while "A2" represents a total area of fluid communication through the four arcuate fluid passages 118, which is equal to the total area of opening of the four arcuate windows 112 explained above. In the present embodiment, the ratio A2/A1 is set to be about "2".

Upon application of a vibrational load to the present engine mount 10, the first and second mounting members 12, 14 are oscillatingly displaced relative to each other in the axial direction, whereby the resonance member 10 is displaced within the pressure-receiving chamber 52 in the load-receiving direction, so that the non-compressible fluid is forced to flow between the upper and lower sections of the pressure-receiving chamber 52 through the annular and arcuate fluid passages 116, 118. The arcuate fluid passages 116 cooperates with the annular restricted fluid passage 118 to constitute a fluid communication passage having a sufficiently large area of fluid communication. Namely, the total area of fluid communication of the arcuate fluid passages 116 is as large as about 85% of the area of the intermediate tapered portion 114, which is about 58% of the entire surface area of the resonance member 100, as described above. According to this arrangement, the resonance member 100 exhibits a sufficiently low dynamic spring constant on the basis of resonance of the fluid flowing through the fluid communication passage, effectively isolating high-frequency vibrations such as a gear noise, and a booming noise that tends to be generated during running of the vehicle at a comparatively high speed.

Further, the tapered or inclined construction of the intermediate tapered portion 114 permits the arcuate fluid passages 118 to have a relatively large total area of fluid communication. That is, the total fluid communication area of the arcuate fluid passages 118 is larger than the total area of the arcuate windows 112 as viewed in the plan view of FIG. 3. Thus, the arcuate fluid passages 118 formed in the intermediate tapered portion 114 can be easily tuned to have a suitable fluid communication area for effectively isolating the high-frequency vibrations, without considerably increasing the diameter of the resonance member 100. Accordingly, the arcuate fluid passages 118 can be easily designed to have a comparatively low resistance to flows of the fluid therethrough upon displacement of the resonance member 100 in the load-receiving direction, whereby the engine mount 10 exhibits a dynamic spring constant that is low enough to isolate vibrations over a wide range of frequencies from medium to high frequencies.

Figure 5:
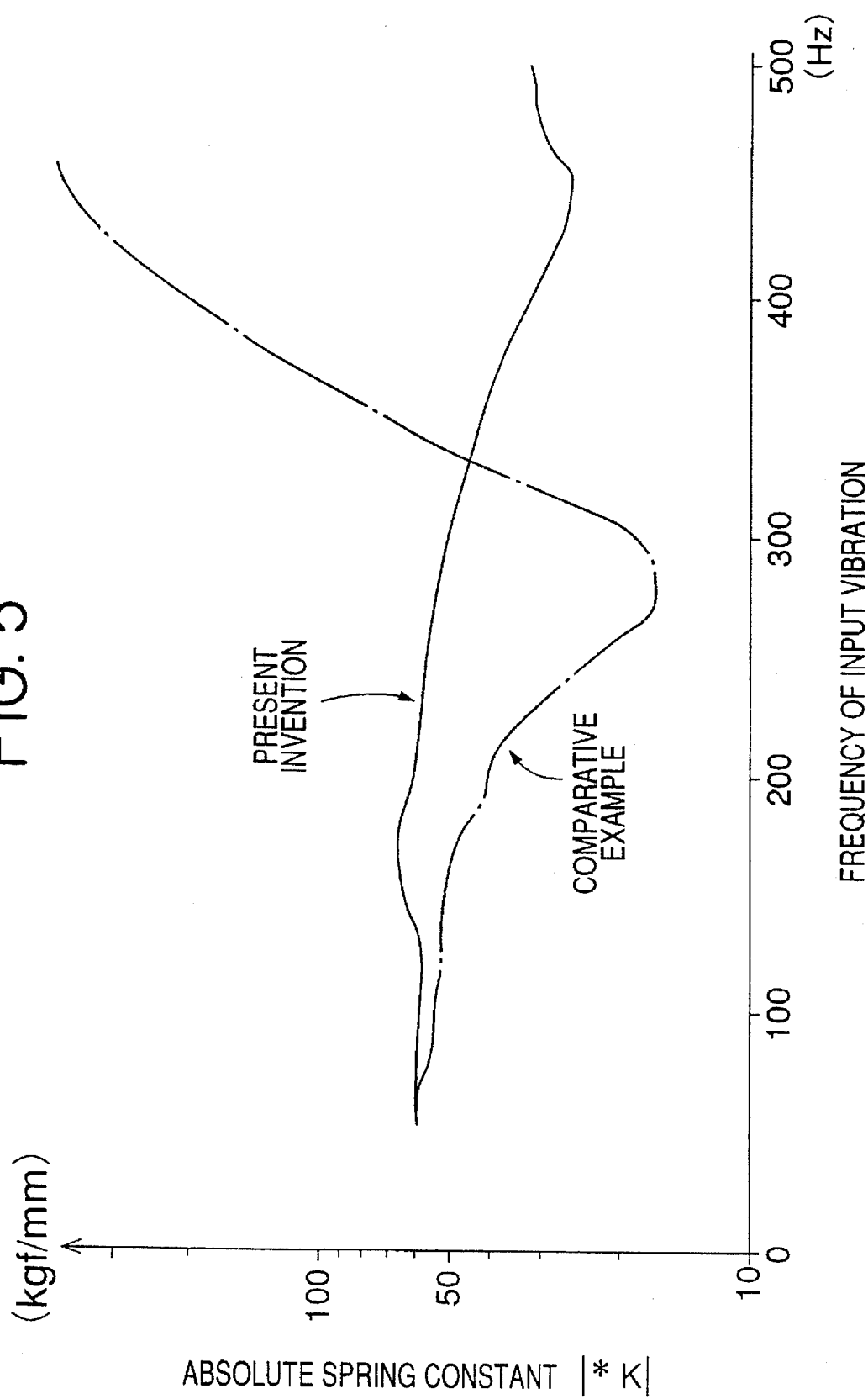
FIG. 5 is a graph showing a relationship between the spring constant of the engine mount of FIG. 1 and the frequency of input vibration, as compared with that of an engine mount according to a comparative example.
Figure 6:
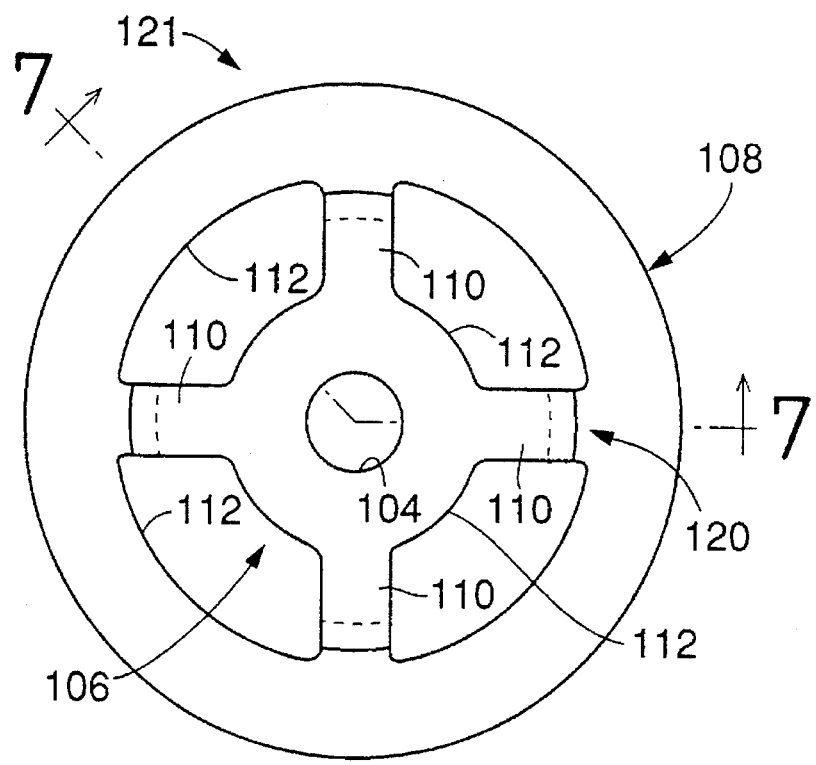
FIG. 6 is a plan view of a hat-shaped resonance member provided in another embodiment of the invention.

An experiment was conducted on the present engine mount 10 and a comparative engine mount wherein a resonance member is a circular disk member whose surface area is substantially equal to the area of the resonance member 100 as measured in the plan view of FIG. 3. A graph of FIG. 5 indicates relationships between the absolute spring constant and the frequency of the input vibrational load of the present engine mount 10 and the comparative engine mount. It will be understood from the graph that the engine mount 10 exhibits an almost consistently low spring constant over a wide range of frequency of the input vibrations, namely, from medium- to high-frequency vibrations.

In the present engine mount 10, the arcuate fluid passages 118 are kept open even when the annular restricted fluid passage 116 is closed upon abutting contact of the annular portion 108 of the resonance member 10 with the first rubber buffer 42 when the first mounting member 12 is excessively displaced in a rebounding direction, that is in an axial direction away from the second mounting member 14. This arrangement is effective to prevent an excessive change of the vibration damping characteristics of the engine mount 10 upon abutting contact of the resonance member 10 with the first rubber buffer 42. In this respect, it is particularly noted that since the ratio A2/A1 of the fluid communication areas of the fluid passage 116 and the fluid passages 118 is set to be about "2", the fluid communication passage 116, 118 has a fluid communication area sufficient for consistently stable vibration damping characteristics, even when the annular portion 108 abuts on the first rubber buffer 42.

It is further noted that the annular portion 108 of the resonance member 100 of the engine mount 10 installed on the vehicle is normally spaced apart by a predetermined distance from the first rubber buffer 42 provided on the constricted portion 33 of the second mounting member 14, in the axial direction opposite to a rebounding direction, such that the annular portion 108 is opposed to the first rubber buffer 42 in the axial direction, so that the amount of displacement of the first and second mounting members 12, 14 in the rebounding direction is limited by the abutting contact of the annular portion 108 with the first rubber buffer 42. Thus, the annular portion 108 cooperates with the first rubber buffer 42 to constitute a rebounding stop mechanism for limiting the rebounding relative displacement of the first and second mounting members 12, 14. Since the annular portion 108 is adapted to contact the rubber buffer 42 over its entire annular area, the annular portion 108 has a sufficient strength and is highly resistant to damage due to abutting contact with the rubber buffer 42. Furthermore, the annular area of contact of the annular portion 108 with the rubber buffer 45 is effective to protect the rubber buffer 42 from being damaged due to the abutting contact with the annular portion 108. Accordingly, the stop mechanism has high degree of durability and load resistance.

The resonance member 100 is positioned relative to the second rubber buffer 76 such that the central disk portion 106 is spaced apart from the second rubber buffer 76 by a predetermined distance in the axial direction opposite to a bounding direction, so that the amount of displacement of the first and second mounting members 12, 14 in the bounding direction is limited by the abutting contact of the central disk portion 106 with the second rubber buffer 76. Thus, the central disk portion 106 cooperates with the second rubber buffer 76 to constitute a bounding stop mechanism for limiting the bounding relative displacement of the first and second mounting members 12, 14. It is noted that the rebounding and bounding stop mechanisms are both compactly incorporated within the engine mount 10. Since the second rubber buffer 76 is adapted to be abuttable on the central disk portion 106 of the resonance member 100, the annular and arcuate fluid passages 116, 118 are kept open and are operable to exhibit the intended damping effect even when the resonance member 100 is brought into abutting contact with the second rubber buffer 76.

The pressure-receiving and equilibrium chambers 52, 54 may be filled with the non-compressible fluid by assembling the partition member 44, diaphragm 46 and related components with respect to the intermediate product 12, 14, 16, within a mass of the fluid accommodated in a suitable container. In this case, air between the elastic body 16 and the resonance member 100 may be easily discharged through the relatively large arcuate windows 112 formed through the intermediate tapered portion 114. Thus, the windows 112 are effective to prevent air from remaining in the pressure-receiving chamber 52.

While one embodiment of the present invention has been described above in detail for illustrative purpose only, it is to be understood that the invention is not limited to the above embodiment but may be otherwise embodied.

Figure 7:
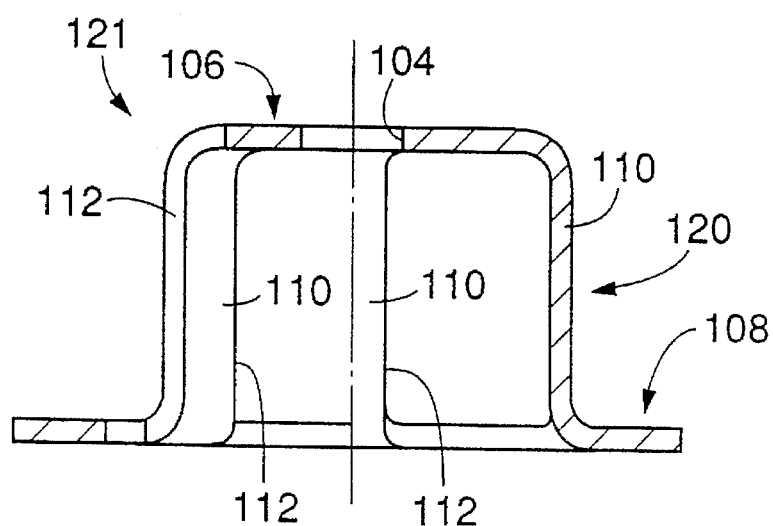
FIG. 7 is a cross sectional view taken along line 7—7 of FIG. 6.
Figure 8:
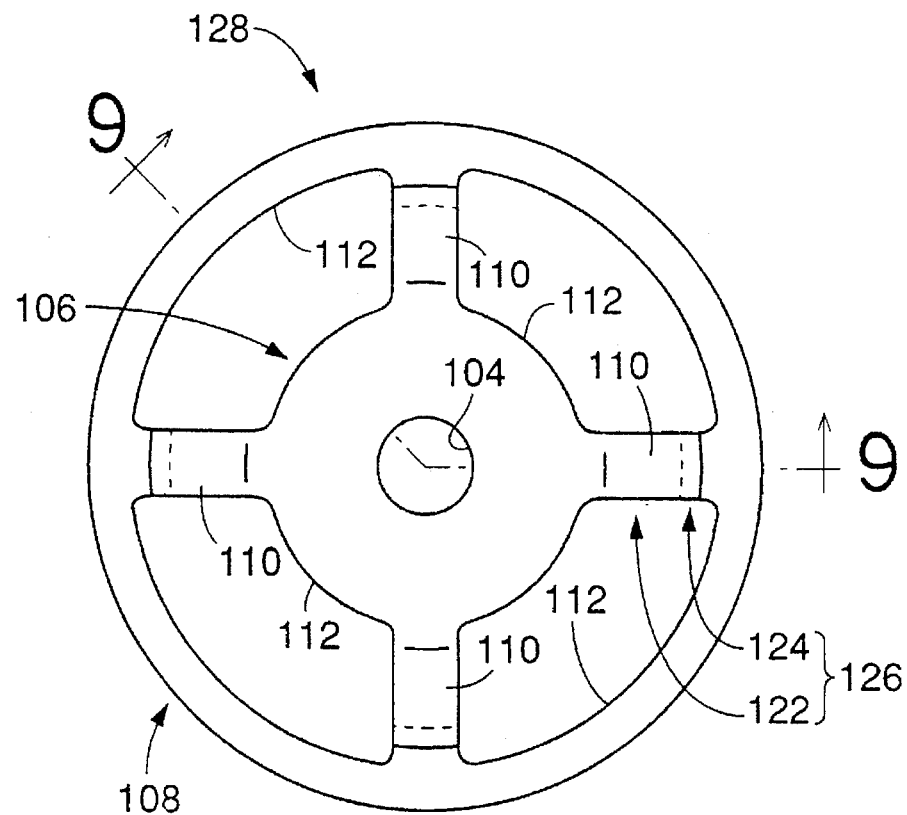
FIG. 8 is a plan view of a hat-shaped resonance member provided in a further embodiment of this invention.
Figure 9:
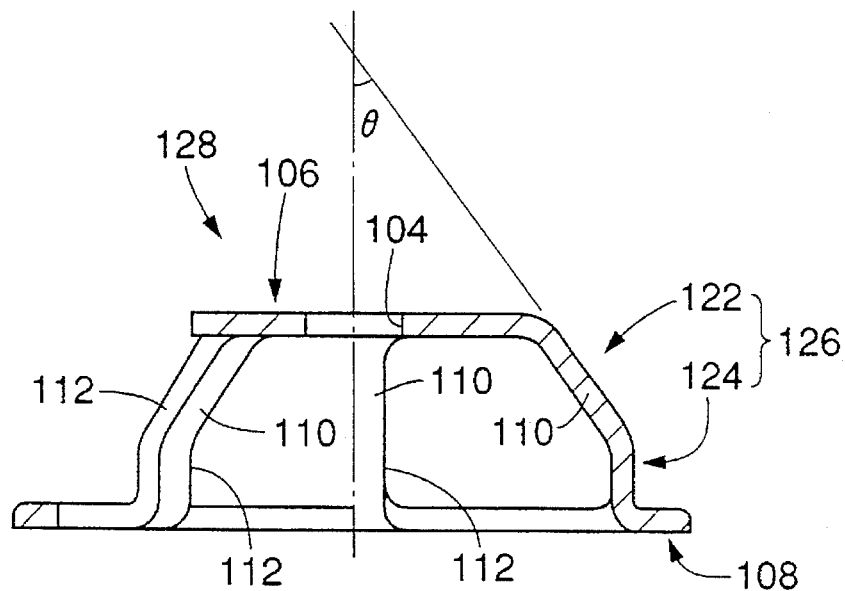
FIG. 9 is a cross sectional view taken along line 9—9 of FIG. 8.

For instance, the configuration of the resonance member may be modified as needed, depending upon the configuration of the pressure-receiving chamber in which the resonance member is disposed, and depending upon the desired damping characteristics of the fluid-filled elastic mount. Examples of modifications of the resonance member are illustrated in FIGS. 6–9. A resonance member 121 illustrated in FIGS. 6 and 7 has an intermediate cylindrical portion 120 whose cylindrical wall is parallel to the load-receiving direction (vertical direction as seen in FIG. 7). A resonance member 128 illustrated in FIGS. 8 and 9 has an intermediate portion 126 consisting of a tapered first section 122 continuous with the central disk portion 106, and a cylindrical second section 124 contiguous with the tapered first section 122. The first tapered section 122 is inclined by a suitable angle $\theta$ with respect to the load-receiving direction (vertical direction as seen in FIG. 9), while the second cylindrical portion 124 has a cylindrical wall parallel to the load-receiving direction. In FIGS. 6–9, components similar to those of the resonance member 100 shown in FIGS. 3 and 4 are identified by the same reference numerals as used in FIGS. 3 and 4.

The shape of the windows 112 formed in the resonance member 100, 121, 128 may be suitably changed as needed depending upon the configuration of the resonance member and the desired damping characteristics of the fluid-filled elastic mount.

Although the illustrated embodiments are adapted such that the pressure-receiving and equilibrium chambers 52, 54 communicate with each other through the two orifices 68, 74, a single orifice or three or more orifices may be provided for fluid communication of these chambers 52, 54. Further, the principle of the present invention is also applicable to a fluid-filled elastic mount wherein a resonance member is provided within a single fluid chamber, as disclosed in JP-B-62-23178.

Further, the pushing mechanism 78 used in the illustrated embodiments may be replaced by other means for selectively opening or closing (enabling or disabling) an orifice or orifices. Such means may include a suitable valve member for cutting an orifice passage, or a movable film which is disposed in an orifice passage such that the film is displaceable or deformable by a predetermined maximum amount, so as to limit the amount of flow of the fluid through the orifice.

It is to be understood that the application of the present invention is not limited to an engine mount of a motor vehicle, but the principle of this invention is equally applicable to various other fluid-filled elastic mounts for use on a motor vehicle or for other applications.

It is to be further understood that the present invention may be embodied with various other changes, modifications and improvements, which may occur to those skilled in the art, without departing from the spirit and scope of the invention defined in the following claims.

What is claimed is:

1. A fluid-filled elastic mount including (a) a first and a second mounting member which are spaced apart from each other in a load-receiving direction in which a vibrational load is primarily applied to the fluid-filled elastic mount, (b) an elastic body which elastically connects said first and second mounting members and which partially defines a fluid-tight space filled with a non-compressible fluid, (c) a resonance member which is supported by said first mounting member and which has an outer portion cooperating with an inner surface of said fluid-tight space to define an annular restricted fluid passage, said resonance member substantially dividing said fluid-tight space into two sections which are arranged in said load-receiving direction and which communicate with each other through said annular restricted fluid passage, and (d) a stop portion provided on said second mounting member such that said outer portion of said resonance member is abuttable on said stop portion to limit an amount of relative displacement of said first and second mounting members in said load-receiving direction, wherein an improvement comprises:

said resonance member comprising an inner portion fixed to said first mounting member, an annular portion as said outer portion abuttable on said stop portion, and an intermediate portion interposed between said inner and annular portions, said intermediate portion including a plurality of connectors connecting said inner and outer portions such that said inner and outer portions are spaced apart from each other in said load-receiving direction; and said intermediate portion having a surface area which is not smaller than a half of an entire surface area of said resonance member, said intermediate portion having a plurality of windows which are separated from each other by said connectors and which function as fluid passages in addition to said annular restricted fluid passage, said fluid passages which correspond to said windows having a total area of fluid communication therethrough, which total area is not smaller than three quarters of said surface area of said intermediate portion.

2. A fluid-filled elastic mount according to claim 1, wherein said plurality of connectors of said intermediate portion of said resonance member are equally spaced from each other in a circumferential direction of said annular portion.

3. A fluid-filled elastic mount according to claim 1, wherein said plurality of connectors of said intermediate portion of said resonance member are inclined with respect to said load-receiving direction so that said intermediate portion is a tapered portion extending radially outwardly from said inner portion toward said annular portion.

4. A fluid-filled elastic mount according to claim 1, wherein said plurality of connectors of said intermediate portion of said resonance member are substantially parallel to said load-receiving direction so that said intermediate portion is a cylindrical portion having a same diameter as said inner portion.

5. A fluid-filled elastic mount according to claim 1, wherein each of said plurality of connectors of said intermediate portion of said resonance member consists of a first section which is contiguous with said inner portion and inclined with respect to said load-receiving direction, and a second section which is contiguous with said first section and substantially parallel to said load-receiving direction, so that said intermediate portion consists of a tapered section which corresponds to said first section and extends radially outwardly from said inner portion toward said annular portion, and a cylindrical section which corresponds to said second section and has a same diameter as said annular portion.

6. A fluid-filled elastic mount according to claim 1, wherein said annular restricted passage and said fluid passages corresponding to said windows have a ratio A2/A1 selected within a range of 1–3, where A1 represents an area of fluid flow through said annular restricted fluid passage, and A2 represents said total area of fluid communication through said fluid passages corresponding to said windows.

7. A fluid-filled elastic mount according to claim 1, wherein said annular portion of said resonance member and said stop portion provided on said second mounting member constitute a first stop mechanism for limiting the amount of relative displacement of said first and second mounting members away from each other in said load-receiving direction, said fluid-filled elastic mount further comprising another stop portion fixed to said second mounting member such that said another stop portion is abuttable on said inner portion of said resonance member, said inner portion and said another stop portion constituting a second stop mechanism for limiting the amount of relative displacement of said first and second mounting members toward each other in said load-receiving direction.

8. A fluid-filled elastic mount according to claim 1, wherein said inner portion of said resonance member consists of a disk-like portion substantially perpendicular to said load-receiving direction.

9. A fluid-filled elastic mount according to claim 1, wherein said plurality of connectors consist of four connectors and said plurality of windows consist of four windows separated from each other by said four connectors.

10. A fluid-filled elastic mount according to claim 1, further including a flexible diaphragm which cooperates with said second mounting member and said elastic body to define said fluid-tight space.

11. A fluid-filled elastic mount according to claim 10, further including a partition member fixedly disposed in said fluid-tight space so as to divide said fluid-tight space into a pressure-receiving chamber partially defined by said elastic body, and an equilibrium chamber partially defined by said flexible diaphragm.

12. A fluid-filled elastic mount according to claim 11, wherein said partition member defines at least one orifice for fluid communication between said pressure-receiving and equilibrium chambers.

13. A fluid-filled elastic mount according to claim 12, further including an actuator device for displacing said flexible diaphragm between a first position in which said flexible diaphragm cuts fluid communication between said pressure-receiving and equilibrium chamber through one of said at least one orifice, and a second position in which said flexible diaphragm permits the fluid communication through said one orifice.

14. A fluid-filled elastic mount according to claim 13, wherein said at least one orifice consists of two orifices which are tuned to damp vibrations of different frequency ranges, and wherein said flexible diaphragm cuts the fluid communication between said pressure-receiving and equilibrium chambers through one of said two orifices when said actuator device is placed in said first position.

15. A fluid-filled elastic mount according to claim 13, wherein said actuator device includes an elastic member which at least partially defines an operating chamber and which acts on said flexible diaphragm, said actuator device further including a switch valve connected to said operating chamber for selectively applying an atmospheric pressure and a reduced pressure to said operating chamber to move said elastic member between two positions corresponding to said first and second positions of said actuator device.

* * * * *